H. C. RUF.
STOPPING APPARATUS FOR MOTOR CARS.
APPLICATION FILED JULY 10, 1914.
1,121,404.
Patented Dec. 15, 1914.
3 SHEETS—SHEET 1.
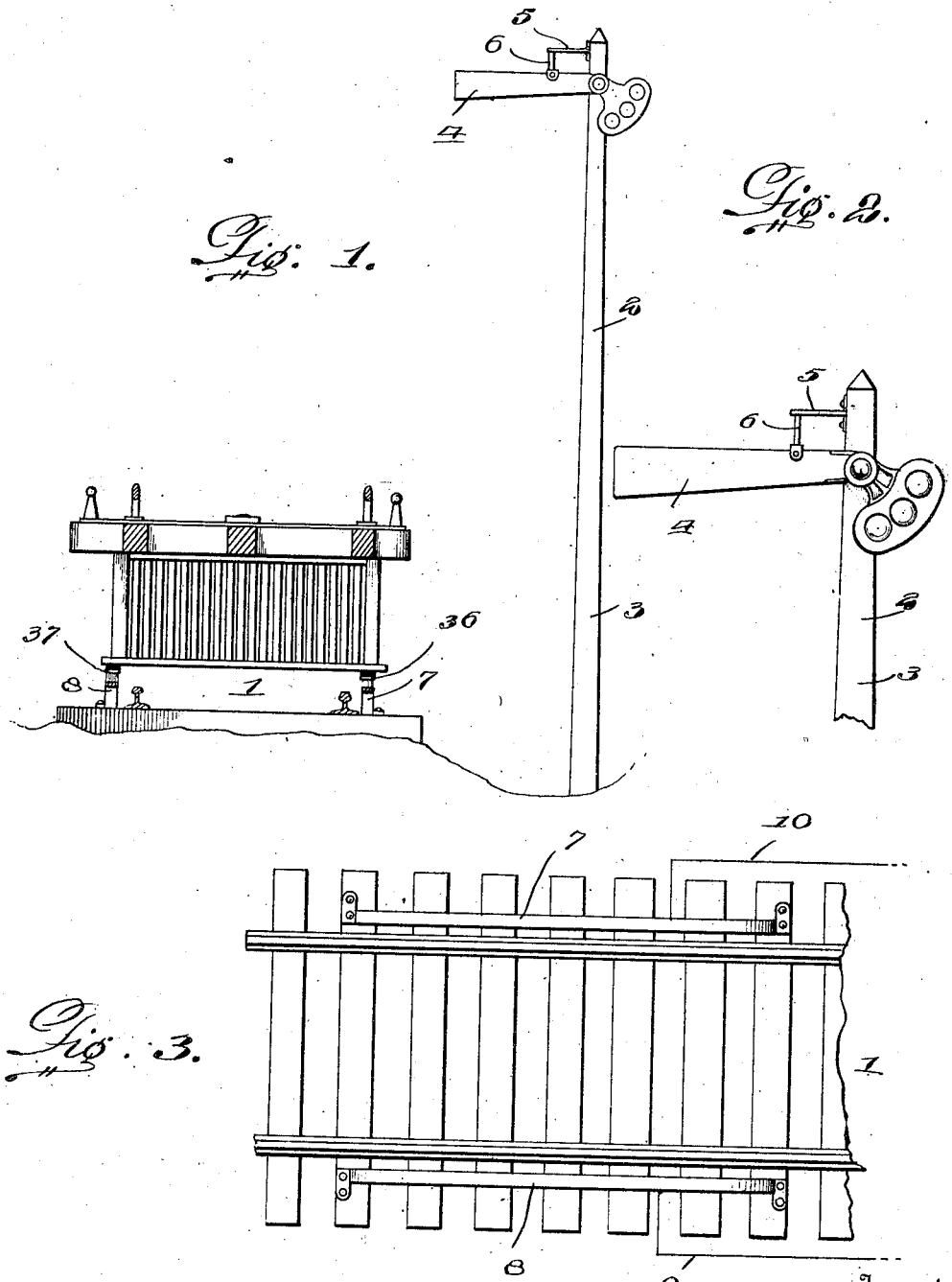
Witnesses
Frederick L. Fox,
John J. McCarthy
Inventor
Henry C. Ruf.
By Victor J. Evans.
Attorney H. C. RUF.
STOPPING APPARATUS FOR MOTOR CARS.
APPLICATION FILED JULY 10, 1914.
1,121,404.
Patented Dec. 15, 1914.
3 SHEETS—SHEET 2.
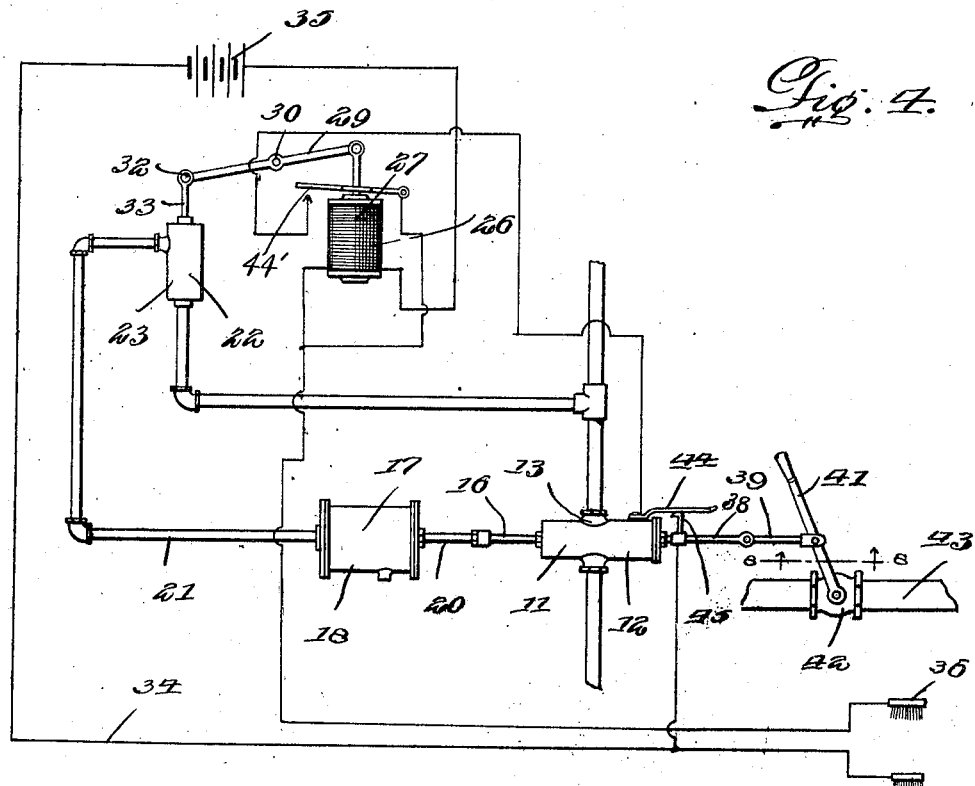
Fig. 4.
Fig. 5.
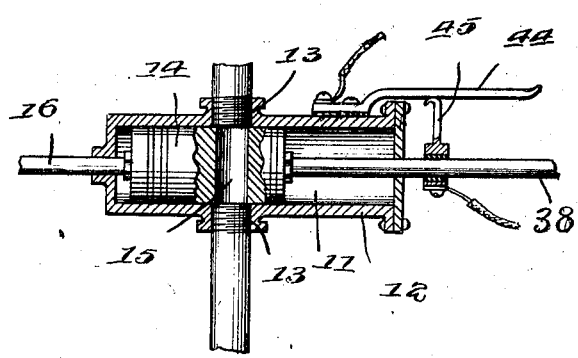
Witnesses
Frederick L. Fox,
John J. McCartney
Inventor
Henry C. Ruf.
By Victor J. Evans
Attorney

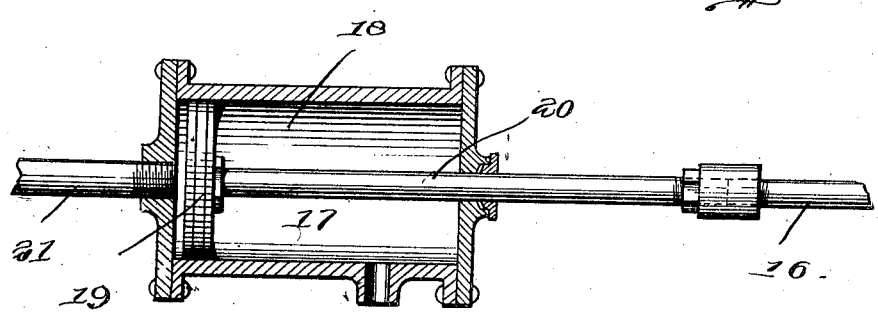
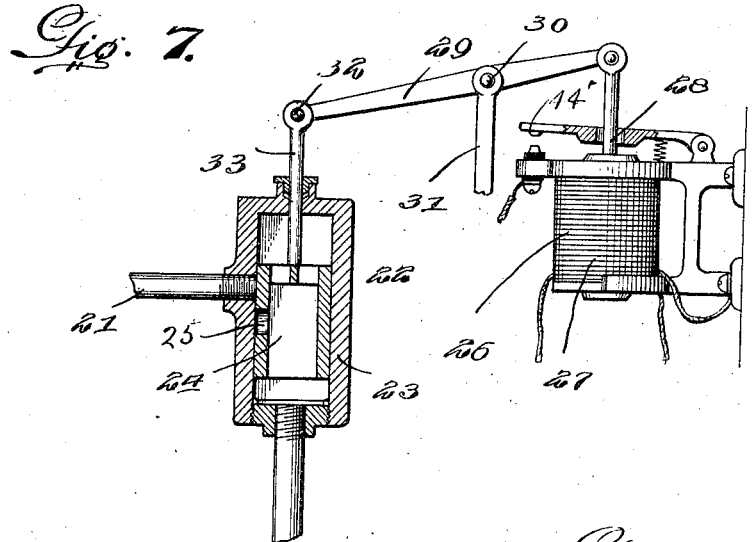
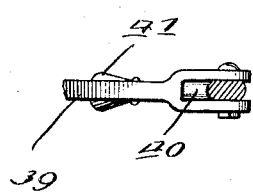

UNITED STATES PATENT OFFICE.

HENRY C. RUF, OF EASTON, PENNSYLVANIA.

STOPPING APPARATUS FOR MOTOR-CARS.

1,121,404.  Specification of Letters Patent.  Patented Dec. 15, 1914.

Application filed July 10, 1914. Serial No. 850,200.

*To all whom it may concern:*

Be it known that I, HENRY C. RUF, a citizen of the United States, residing at Easton, in the county of Northampton and State of Pennsylvania, have invented new and useful Improvements in Stopping Apparatus for Motor-Cars, of which the following is a specification.

This invention relates to improvements in stopping mechanism for motor cars and has particular application to train stopping apparatus.

In carrying out the present invention, it is my purpose to provide apparatus of the class described which will be electrically controlled and which will embody among other features means for cutting off the propelling power of the motor car and operable from a motor connected up with a suitable source of supply, and means controlling communication between the motor and source and adapted to be actuated by an electroresponsive device connected in an electric circuit including a circuit closing device and a circuit breaker, such circuit breaker being connected with the first-named means and operable therefrom under the action of said motor to break the circuit succeeding the cutting off of the propelling power of the car whereby the electroresponsive device will be deënergized so that the parts may be restored to normal position.

It is also my purpose to provide stopping mechanism for motor cars which may be installed and maintained at a minimum expense and which will be found especially useful in conjunction with the block signaling system of the railway.

With the above and other objects in view, the invention consists in the construction, combination and arrangement of parts hereinafter set forth in and falling within the scope of the claim.

In the accompanying drawings: Figure 1 is a cross sectional view through a trackway and locomotive thereon showing the relative positions of the contact rails, car carried brushes engaging such rails and the road signals. Fig. 2 is an enlarged fragmentary side elevation of one of the signals showing the signal controlled circuit closer. Fig. 3 is a fragmentary top plan view of the trackway. Fig. 4 is a diagrammatic view of the car carried mechanism. Fig. 5 is an enlarged longitudinal sectional view through the mechanism for cutting off the propelling power of the motor car. Fig. 6 is a longitudinal sectional view through the motor for actuating the cut off device. Fig. 7 is a view in side elevation partly in section of the valve controlling communication between the motor and source and the electroresponsive device for operating such valve. Fig. 8 is a sectional view on the line 8—8 of Fig. 4 looking in the direction of the arrow.

Referring now to the drawings in detail, 1 designates a trackway which is preferably divided into blocks and located at the entrance to each block and controlling traffic thereinto is a semaphore 2 comprising a vertical standard 3 and a signal blade 4 pivoted upon the standard 3 adjacent to the upper end thereof and capable of movement to danger and clear positions. Also mounted upon the upper end of the semaphore 3 is a circuit closer comprising a stationary contact 5 projecting outwardly from the standard 3 at right angles thereto and above the signal blade 4, and a movable contact 6 secured to the signal blade and projecting upwardly therefrom and adapted to engage the contact 5 when the signal blade 4 is swung to danger or horizontal position. Disposed between the lines of rails of the trackway at the entrance to each block and spaced apart in parallelism are longitudinally extending contact rails 7, 8 and leading from the stationary contact 5 on the adjacent semaphore is a conductor 9 terminally connected with the contact rail 8, while leading from the movable contact 6 on the signal blade of the adjacent semaphore is a conductor 10, terminally connected with the contact rail.

In the present instance, I have shown the car carried stopping mechanism as installed in a steam driven locomotive and in this connection I wish it to be understood that the invention in its useful application is not limited to steam driven motor cars as the same may be installed in motor cars propelled by electricity, gas, liquid fuel, air and the like.

This car carried stopping mechanism comprises a cut off device 11 which, in the embodiment of the invention selected for illustrative purposes, comprises a cylindrical casing 12 formed at diametrically opposite points with ports 13, 13 and a head 14 mounted within the casing 12 and capable of longitudinal sliding movement therein and formed with a transverse passage 15 normally registering with the ports 13, 13, the casing 12 being connected in the steam main by means of the ports 13, 13. Connected with one end of the head 14 and extending outwardly of the adjacent end of the casing is a connecting rod 16 connected up with a motor 17. In this instance, the motor 17 comprises a cylinder 18 and a piston 19 disposed within the cylinder and capable of rectilinear movement therein and equipped with a piston rod 20 projecting outwardly of one end wall of the cylinder and connected with the rod 16 of the head 14. Leading into one end of the cylinder 18 of the motor 17 is a supply pipe 21 connected up with a suitable source of fluid supply such, for instance, as the steam space of the boiler and located in the supply pipe 21 is a controlling valve 22 comprising a vertical casing 23 having the opposite side walls thereof equipped with axially alining ports establishing communication between the pipe 21 and the casing, and a valve plate 24 mounted within the casing and capable of vertical sliding movement therein and formed with a transverse passage 25 adapted, when the plate is in one position, to establish communication between the ports in the opposite walls of the casing, and when the plate is in another position, to cut off such communication.

26 indicates an electroresponsive device which, in this instance, is in the form of a solenoid 27 and an armature 28 movable into and out of the solenoid and having the outer end thereof pivotally connected with a lever 29 fulcrumed between its ends as at 30 upon a standard 31 and having the opposite end thereof pivotally connected as at 32 with a stem 33 working through the upper end wall of the valve casing 23 and connected with the valve plate 24. The solenoid 27 is connected in a car carried partial circuit 34 including a suitable source of electrical energy as a battery 35 and having the terminals thereof connected with brushes 36, 37 adapted to contact with the contact rails 7 and 8 respectively as the motor car passes over such contact rails. By means of this construction, it will be seen that when a signal blade is set at danger position the contact 6 will engage the contact 5 and so electrically engage the conductors 9 and 10. Should a motor car attempt to pass such danger signal the brushes 36 and 37 contacting with the contact rails 7 and 8 will complete an electric circuit including the battery 35 and the solenoid 27, thereby energizing such solenoid. Upon the energization of the solenoid the lever 29 is swung about its pivotal connection 30 with the standard 31 and the valve plate 24 slid within the casing 23 to establish communication between the source of supply and the motor 17. In the operation of the motor 17 the sliding head 14 of the cut off device is actuated to move the passage 15 out of registration with the ports 13, 13 and so cut off communication between the steam dome of the boiler and the drive cylinders of the engine. When the contact shoes or brushes 36, 37 engage the rails 7 and 8 respectively, current flows from one side of the battery 35, through one side of the partial circuit 34, the brush 37, contact rail 8, conductor 9, stationary contact 5, movable contact 6 in engagement therewith, conductor 10, contact rail 7, shoe or brush 36 and through the remaining side of the partial circuit 34 and the winding of the solenoid 27 therein.

Connected with the remaining end of the sliding head 14 and projecting outwardly of the adjacent end wall of the cylindrical casing 11 is a connecting rod 38 having the outer end thereof pivotally connected to one extremity of a link 39 formed with an elongated slot 40 receiving the handle 41 of a valve 42 located in the train line air pipe or brake pipe 43 of the air brake system of the train or car. Connected in multiple with the car carried partial circuit 34 and in series with the solenoid 27, the battery 35, and the circuit closer 44' under the control of the solenoid is a circuit breaker comprising a stationary contact arm 44 fast to the last-mentioned end of the cylindrical casing 11 and extending outwardly therefrom and a movable contact arm 45 connected with the connecting rod 38 and projecting upwardly therefrom and normally engaging the stationary arm 44 so as to hold the car carried partial circuit normally at this point. When the sliding head 14 is actuated as previously described to cut off the flow of steam from the steam dome to the drive cylinders of the locomotive the connecting rod 38 and limb 39 swing the handle 41 of the valve 42 and so actuate the latter to establish communication between the brake pipe and the atmosphere whereby the train line pressure is reduced and the brakes applied. Upon the head 14 reaching the limit of its movement under the action of the motor 17 the movable contact arm 45 disengages the arm 44 and so breaks the circuit through the solenoid 27 whereby the engineer may restore the cut off device and the valve 42 to normal position and cut off communication between the motor 17 and source of supply.

In the initial energization of the solenoid 27, the circuit closer 44' under the control of said solenoid is actuated to closed position thereby closing the battery circuit through the winding of the solenoid and the circuit closer 44 independently of the contact shoes 36 and 37 so that when the latter leave the respective contact rails, the solenoid will remain energized and the parts active. When, however, the circuit breaker composed of the contacts 44 and 45 is actuated to open position succeeding the operation of the car carried stopping mechanism the battery circuit is broken and the solenoid 26 deënergized whereby the parts under the control of said solenoid will be restored to normal position.

From the foregoing description taken in connection with the accompanying drawings, the construction and mode of operation of my improved stopping apparatus for motor cars will be readily apparent. It will be seen that I have provided a stopping mechanism for motor cars whereby the propelling power of the car will be cut off and the brakes applied in the event of such car running by a danger signal and wherein the parts may be restored to normal position succeeding the stopping of the car.

While I have herein shown and described one preferred form of my invention by way of illustration, I wish it to be understood that I do not limit or confine myself to the precise details of construction herein described and delineated, as modification and variation may be made within the scope of the claim without departing from the spirit of the invention.

I claim:

In stopping apparatus for motor cars, a device for cutting off the propelling power of the car, a fluid motor for operating said device, a source of fluid supply for said motor, a valve controlling communication between said motor and source, an electroresponsive device for actuating said valve, an electric circuit for said device, a source of electrical energy in said circuit, brushes forming the terminals of said circuit and adapted to close the latter when bridged, a circuit closer under the control of said electroresponsive device and operated therefrom in the energization thereof to maintain the circuit closed independently of the bridging of said brushes, and a circuit breaker in said holding circuit and connected with said cut off device and operable therefrom to break said circuit succeeding the cutting off of the propelling power of the car whereby the electroresponsive device will be deënergized and the circuit closer restored to normal position.

In testimony whereof I affix my signature in presence of two witnesses.

HENRY C. RUF.

Witnesses:
CHAS. B. BRUNNER,
HELEN M. ACKERMAN.